United States Patent Office 3,501,900
Patented Mar. 24, 1970

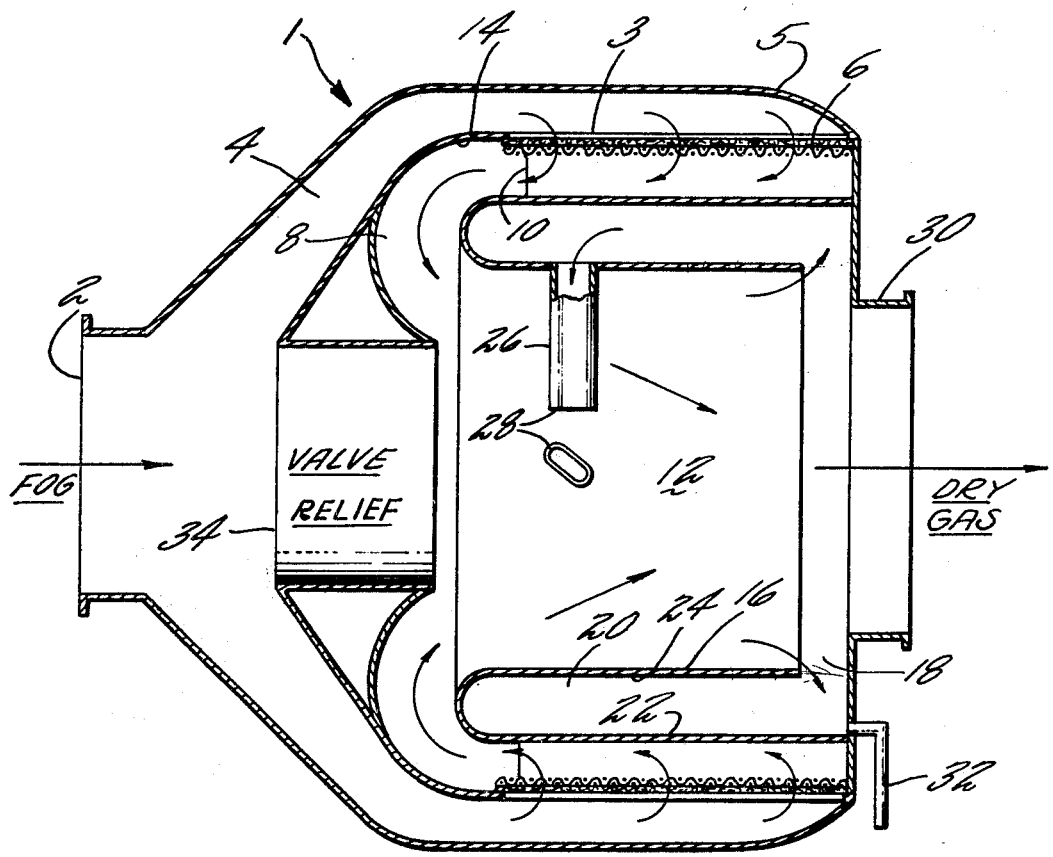

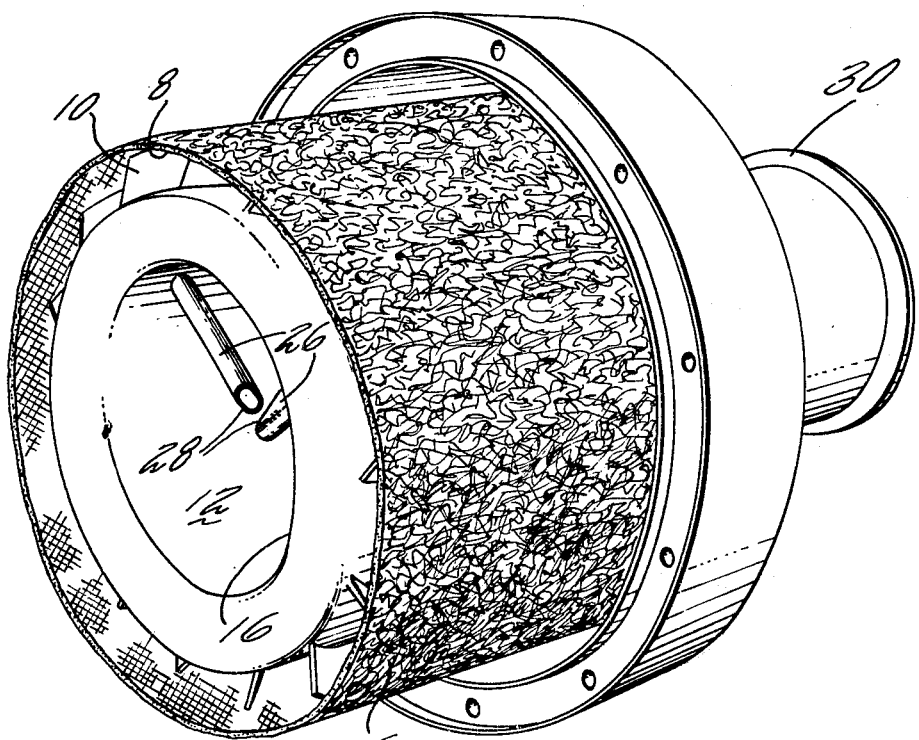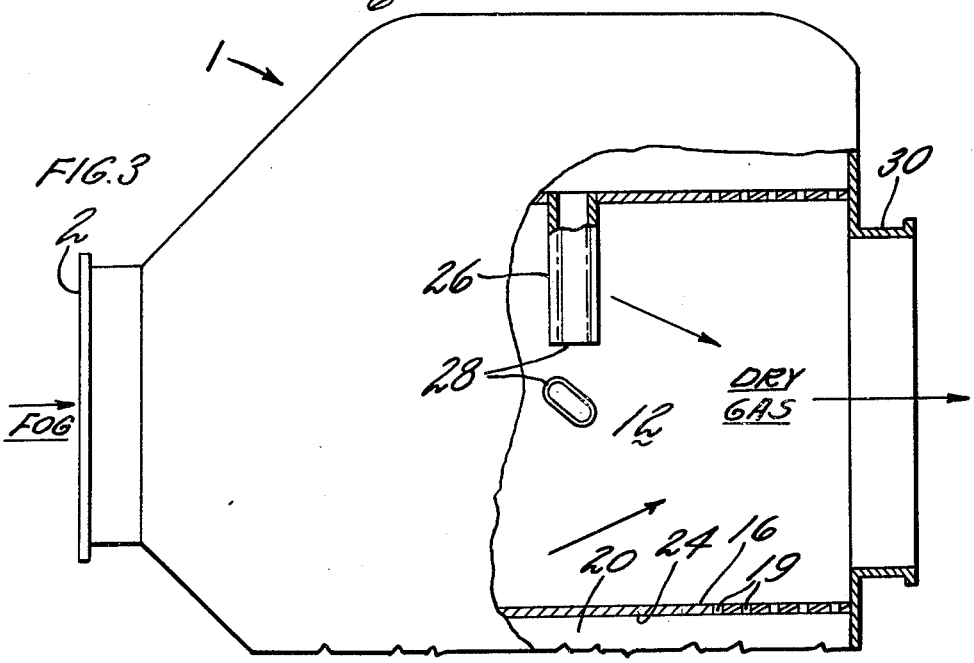

3,501,900
MOISTURE SEPARATOR
John L. Warner, Simsbury, Conn., Walter J. Barry, Longmeadow, and George E. Wilmot, Jr., Feeding Hills, Mass., assignors to United Aircraft Corporation, East Hartford, Conn., a corporation of Delaware
Filed Sept. 27, 1967, Ser. No. 671,045
Int. Cl. B01d 46/46, 45/12
U.S. Cl. 55—313                                    7 Claims

ABSTRACT OF THE DISCLOSURE

The coalescer, vortex chamber and liquid collecting chamber of a moisture separator are placed in radial layers around the axis of the separator housing. A counter-flow arrangement is utilized to provide a flow path of sufficient length to accomplish coalescing, separation and collection of liquid.

BACKGROUND OF THE INVENTION

Field of invention

This invention relates to moisture separators, and particularly to an improved water separator for use in an airplane air-conditioning system.

Description of the prior art

Water separators known heretofore have been unduly long and heavy. Packaging considerations for advanced airplane air-conditioning systems have necessitated the advent of a water separator which is shorter in length than the prior art water separator such as those disclosed in the application of Baker et al., Ser. No. 392,747, and Farnum, Ser. No. 392,748, both filed on Aug. 18, 1964, now U.S. Patents 3,347,027 and 3,339,349, respectively and assigned to the same assignee.

The new, larger airplanes such as the Boeing 747, for example, which will transport many more passengers than exiting airplanes, requires an air-conditioning system of greater capacity than systems for smaller airplanes. It is necessary to provide a system which is more efficient than present systems so that a greater cooling or heating capacity may be realized per pound and unit of volume of air-conditioning equipment than has been known heretofore. The moisture separator according to this invention is not only shorter in length and, therefore, smaller in volume, but is also lighter in weight, more efficient and has a lower pressure drop than prior art water separators of comparable size and capacity known heretofore.

SUMMARY OF THE INVENTION

A primary object of the present invention is to provide a short, light-weight improved moisture separator.

A second object of the present invention is to provide a water separator as above which is also more efficient and has a lower pressure drop and greater capacity than water separators of the same size known heretofore.

In accordance with the present invention the above, and other objects, are achieved by a counter-flow type moisture separator in which the coalescer, vortex chamber and the liquid collecting chamber are contained within the same housing length; i.e., the coalescer is placed, for example, on an outer diameter of the moisture separator housing, the vortex chamber on a smaller diameter inside the coalescer diameter, and the liquid collecting chamber on a still smaller diameter inside the vortex chamber diameter. In order to provide a flow path long enough to accomplish coalescing of the moisture and separation and collection of the liquid within the short overall length of the moisture separator, the flow is caused to reverse its direction during its travel through the moisture separator.

While it would appear that such a flow path would result in an increased pressure drop across the moisture separator as compared with state-of-the-art moisture separators as disclosed in the above-mentioned applications of Baker et al. and Farnum, such is not the case. We have found that by such construction low pressure drop can be maintained, while the length (and consequently the volume) can be reduced by a factor of two in comparison with prior art moisture separators in which the coalescer, vortex chamber and liquid collecting chamber are "strung out" in a line. Furthermore, the weight of our moisture separator is approximately twenty percent less than an equivalent capacity state-of-the-art moisture separator.

The foregoing and other objects, features and advantages of the present invention will become more apparent in the light of the following description of a preferred embodiment thereof as illustrated in the accompanying drawings.

DESCRIPTION OF THE DRAWINGS

FIG. 1 is a schematic drawing of an exemplary embodiment of a moisture separator in accordance with the present invention;

FIG. 2 is a perspective view of a portion of the moisture separator in accordance with the present invention showing the outlet, coalescer, vortex vanes and port tubes.

DESCRIPTION OF THE PREFERRED EMBODIMENT

Referring to FIG. 1 and FIG. 2, the moisture laden gas (fog) enters the inlet 2 of the moisture separator housing, shown generally by the numeral 1, and flows into an outer annular chamber 4 which may be coaxial with and surrounds the remaining portion of the separator. The fluid is then caused to flow radially inwardly by a first turning means, which may be a shaped header 5 towards the axis of the water separator through an outlet 3 and and a coalescer 6, which may be of any type known in the art, such as fabric formed from tetrafluoroethylene fibers supported by a wire mesh screen, and then into an inner annular chamber 8. The flow in the inner annular chamber 8 is caused to change direction approximately ninety degrees from its direction through the coalescer by a second turning means, which may be the wall 22 and, therefore, 180° from its direction in the outer annular chamber 4. Vortex vanes 10 are disposed within the inner annular chamber 8 so that as the gas and water droplets flow therethrough, the vanes impart a swirling motion to the gas and water droplets. Upon leaving the vanes, the gas and water droplets continue to flow through the inner annular chamber 8 which now assumes a U-shape and leads into an interior cylindrical chamber 12 within the separator. The flow, in passing through the third turning means, which for purposes of the description is the U-shaped portion of the inner annular chamber 8, has now reversed its direction 180° again so that it is now proceeding through the water separator in the same direction as that of the entering fog. The swirling motion imparted to the gas and water droplets by the vortex vanes 10 causes the water droplets to be thrown outwardly towards the outer wall 14 of the inner annular chamber 8, and as the fluid proceeds through the U-shaped portion of the inner annular chamber 8 and thence into the interior chamber 12 of the separator, the water droplets flow along the wall 16 of said chamber 12 and into the inlet means 18 of the liquid collecting chamber 20, which is positioned between the inner wall 22 of the inner annular chamber 8 and the wall 16 of the interior chamber 12 of the water separator. The inlet means 18 may be an opening as shown in FIG. 1. Another example of inlet means is perforations 19 in the wall 16 as shown in FIG. 3. As the water droplets flow along the wall 16, they are forced through the perforations 19 and into the collecting chamber 20. A portion of the dry gas flows into the liquid collecting chamber 20, forcing the droplets into the chamber. Flow of this air is induced out of the liquid collecting chamber 20 by port tubes 26, the outlets 28 of which tubes are positioned near the axis of the interior chamber 12. The pressure at the wall 16 of the interior chamber 12 and, consequently, the pressure of the gas entering the liquid collecting chamber 20 is greater than the pressure along the axis of the interior chamber 12 because of the vortex situation existent therein. Thus the dry gas which flows into the liquid collecting chamber 20 with the liquid droplets is induced to flow back into the interior chamber 12 where it combines with the main stream of dry gas and passes through a dry gas outlet 30 from the interior chamber 12. The liquid in the liquid collecting chamber 20 then flows into means 32 for removing the liquid so collected. A safety device which may be incorporated in the moisture separator is pressure relief valve 34 which is provided at the inlet of the moisture separator so that if the coalescer ices up, and the pressure drop across the moisture separator becomes greater than a predetermined limit, the valve opens and the fog is permitted to flow straight through the interior chamber 12 to the outlet.

What we claim as new and desire to secure by Letters Patent of the United States is:

1. Apparatus for removing particles of liquid entrained in a stream of gaseous fluid, comprising a housing;
   an outer annular chamber having an outer wall, and inner wall, a fluid inlet and a radial fluid outlet;
   a coalescer disposed within said housing and in fluid communication with the radial outlet of said outer annular chamber;
   a liquid collecting chamber disposed radially inwardly of said outer annular chamber and spaced therefrom for receiving the coalesced moisture, said liquid collecting chamber having an end wall, an outer wall and an inner wall and defining an inner annular chamber between the inner wall of said outer annular chamber and the outer wall of said liquid collecting chamber, said inner annular chamber having an annular U-shaped outlet portion, and defining an interior chamber by the inner wall of said liquid collecting chamber, said interior chamber being in fluid communication with the U-shaped outlet portion of said inner annular chamber;
   swirl means disposed within said inner annular chamber for causing the flow therethrough to swirl;
   inlet means for receiving the coalesced moisture into said liquid collecting chamber;
   means for removing liquid collected in said liquid collecting chamber; and
   a dry gas outlet from said interior chamber.

2. Apparatus for removing particles of liquid entrained in a stream of gaseous fluid as recited in claim 1, wherein the swirl means comprise swirl vanes.

3. Apparatus for removing particles of liquid entrained in a stream of gaseous fluid as recited in claim 1, and additionally comprising:
   flow inducing means for inducing the flow of dry gas out of said liquid collecting chamber and into the interior chamber.

4. Apparatus for removing particles of liquid entrained in a stream of gaseous fluid as recited in claim 3, wherein the flow inducing means comprises:
   a tube disposed in said interior chamber, one end of said tube terminating at said liquid collecting chamber, and the opposite end of said tube terminating in said interior chamber proximate the axis of said interior chamber for inducing the flow of dry gas out of said liquid collecting chamber into said interior chamber.

5. Apparatus for removing particles of liquid entrained in a steram of gaseous fluid as recited in claim 1, and additionally comprising:
   normally closed valve means disposed between said outer annular chamber inlet and said interior chamber, and adapted to open in response to a pressure differential across said chamber inlet and said interior chamber above a predetermined limit.

6. Apparatus for removing particles of liquid entrained in a stream of gaseous fluid as recited in claim 1, wherein said inlet means comprise:
   an opening in the inner wall of said liquid collecting chamber disposed adjacent the downstream end of said liquid collecting chamber.

7. Apparatus for removing particles of liquid entrained in a stream of gaseous fluid as recited in claim 1, wherein said inlet means comprise:
   the inner wall of said liquid collecting chamber being perforated, whereby the coalesced liquid passes through the perforations and into said liquid collecting chamber.

References Cited
UNITED STATES PATENTS

| | | | |
|---|---|---|---|
| 2,010,456 | 8/1935 | Jones | 55—337 |
| 2,659,450 | 11/1953 | Baird | 55—456 |
| 2,823,760 | 2/1958 | Andersen. | |
| 3,176,501 | 4/1965 | Briggs | 55—456 |
| 3,187,895 | 6/1965 | Pall et al. | |
| 3,200,568 | 8/1965 | McNeil | 55—459 |
| 3,228,174 | 1/1966 | Perry | 55—174 |
| 3,339,349 | 9/1967 | Farnum | 55—309 |
| 3,347,027 | 10/1967 | Baker et al. | 55—320 |
| 2,970,671 | 2/1961 | Warner. | |
| 3,286,787 | 11/1966 | Wirt | 181—50 |
| 2,921,646 | 1/1960 | Poole | 55—396 |

HARRY B. THORNTON, Primary Examiner

B. NOZICK, Assistant Examiner

U.S. Cl. X.R.

55—337, 441, 456, 486, 528